United States Patent [19]
Lee

[11] Patent Number: 6,006,094
[45] Date of Patent: Dec. 21, 1999

[54] METHOD OF ROUTING AN INTERNATIONAL CALL TO A FOREIGN MOBILE SUBSCRIBER

[75] Inventor: Man Yiu Lee, Epping, Australia

[73] Assignee: Nokia Telecommunications OY, Espoo, Finland

[21] Appl. No.: 08/860,883

[22] PCT Filed: Dec. 23, 1994

[86] PCT No.: PCT/FI94/00581

§ 371 Date: Aug. 27, 1997

§ 102(e) Date: Aug. 27, 1997

[87] PCT Pub. No.: WO96/20574

PCT Pub. Date: Jul. 4, 1996

[51] Int. Cl.⁶ .................................................. H04Q 7/20
[52] U.S. Cl. .......................... 455/445; 455/432; 455/461
[58] Field of Search .................................... 455/445, 433, 455/435, 455, 436, 414, 422, 560, 461, 432; 379/219, 220

[56] References Cited

U.S. PATENT DOCUMENTS

| | | | |
|---|---|---|---|
| 5,109,408 | 4/1992 | Greenspan et al. | 379/197 |
| 5,210,787 | 5/1993 | Hayes et al. | 455/435 |
| 5,408,419 | 4/1995 | Wong | 395/200.55 |
| 5,610,974 | 3/1997 | Lantto | 455/433 |
| 5,734,700 | 3/1998 | Hauser et al. | 455/413 |

FOREIGN PATENT DOCUMENTS

| | | | |
|---|---|---|---|
| 605120 | 7/1994 | European Pat. Off. | H04Q 7/04 |
| 675663 | 10/1995 | Germany | H04Q 7/38 |
| 2280085 | 1/1995 | United Kingdom | H04Q 7/22 |
| 95/09514 | 4/1995 | WIPO | H04Q 7/38 |

OTHER PUBLICATIONS

Beller, Call Delivery to Portable Telephones away from Home using the Local Exchange Network, IEEE International Conference on Communications, vol. 2, Denver US, pp. 948–953, Jun., 1991.

Brini, et al: "International roaming in digital cellular networks", CSELT Technical Reports, vol. 20, No. 6, Dec. 1992, pp. 532–533, figure 1b, abstract.

Barbetta et al: "Interworking issues in international UPT service", CSELT Technicals Reports, vol. 21, No. 4, p. 833–41, Oct. 1993, Dialog Information Services, File 2, INSPEC Abstract No.: B9403–625OF–067.

*Primary Examiner*—Reinhard J. Eisenzopf
*Assistant Examiner*—Charles N. Appiah
*Attorney, Agent, or Firm*—IP Group of Pillsbury Madison & Sutro LLP

[57] ABSTRACT

A new prefix, an international mobile call prefix, is provided in a telecommunications network, such as PSTN, for routing the PSTN originating international call to a foreign mobile subscriber. When a local PSTN exchange receives the international mobile call prefix in the dialed telephone number, it will route the call to a predetermined destination in the same country. The predetermined destination is a network element having a capability of making international routing information interrogation to a home PLMN of a called foreign mobile subscriber. Upon receiving the routing information from the home PLMN the call will be routed to the current location of the called foreign mobile subscriber according to the routing information. As a result, unnecessary international legs in the call can be avoided when the called mobile subscriber is roaming abroad.

7 Claims, 7 Drawing Sheets

| CC | NDC | SN |

FIG. 7

| G+ | CC | NDC | SN |

FIG. 8

| Prefix | Destination |
|---|---|
| 0011 | PSTN Intl 6W |
| 0411999 | OPTUS GSM |
| 049 | GSM interrogation MSC |
| . | . |
| . | . |
| . | . |

FIG. 9

FIG. 10A  | G+ | NDC | SN |

FIG. 10B  | G+ | SN |

METHOD OF ROUTING AN INTERNATIONAL CALL TO A FOREIGN MOBILE SUBSCRIBER

This application is the national phase of international application PCT/FI94/00581, filed Dec. 23, 1994 which was designated the U.S.

FIELD OF THE INVENTION

The present invention relates to routing an international call, e.g. from a PSTN subscriber, to a mobile subscriber having a home PLMN in a foreign country.

BACKGROUND OF THE INVENTION

The modern mobile telecommunications network offer a new attractive feature: roaming between several operationally independent public land mobile networks (PLMN). Roaming between PLMNs in different countries is called international roaming. Normally a mobile subscriber has a subscription relationship with a single PLMN. This specific PLMN is called the home PLMN of the mobile subscriber. Service can be obtained also from other PLMNs, depending among other conditions on subscriptions. For example a mobile subscriber who has a subscription relationship with a national PLMN in Finland may also make outgoing calls and receive incoming calls through another PLMN for example in Germany, if there are agreements between the operators of the two PLMNs. The other PLMN is sometimes called visited PLMN. One example of a standardized system supporting international roaming is the pan-European digital mobile radio system GSM (Global System for Mobile Communications) and its modification DCS1800 (Digital Communications System). The GSM supports both mobile station roaming in which a mobile station moves from one PLMN to another, and a subscriber identification module (SIM) roaming in which only a SIM moves. The latter may allow also roaming between PLMNs having incompatible radio interfaces, such as different operating frequencies.

A significant disadvantage that makes the international roaming less attractive is the cost of the international calls. Typically a calling party is charged for the first half of the routing to the home PLMN of the called mobile subscriber, and the called party is charged for the second half of the routing from the home PLMN to the visited PLMN. Thus, the called party has to pay the expensive international call charges also for calls which he/she does not want to receive at all. The expensive call charges will discourage the mobile subscriber from extensively using the roaming service. Actually, it is believed that most of the mobile subscribers will have incoming call barried while roaming.

In the international calls originating from the roaming mobile station, the routing of the call is always optimized. However, routing of the call destinating to a roaming mobile station is not optimized, and consequently, double international legs and very high international call charges may unnecessarily arise. This problem will be explained by means of an example with reference to FIGS. 1 and 2.

Figure 1:
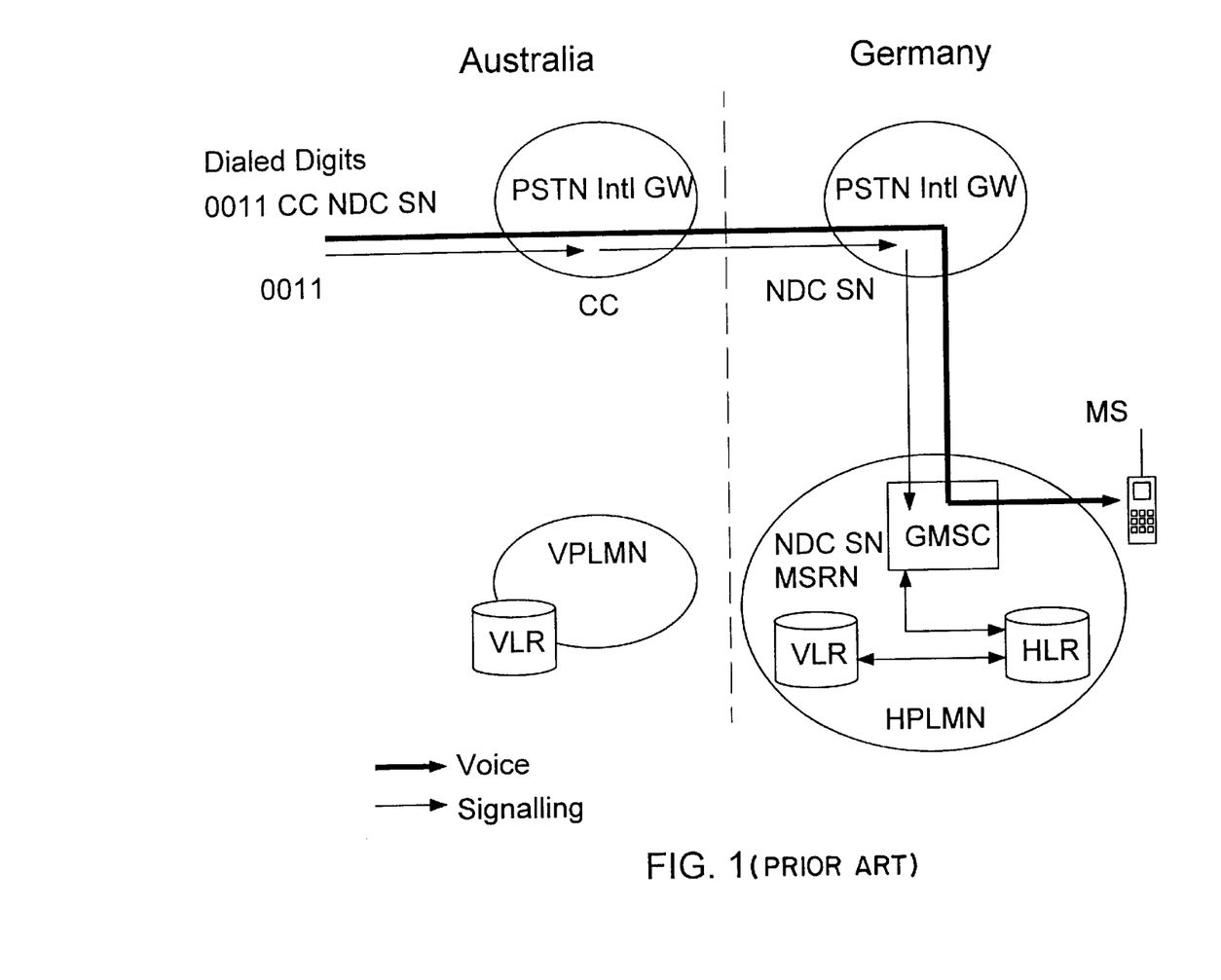
FIG. 1 is a system diagram illustrating the prior art call routing for a PSTN originating international call to a foreign mobile subscriber located in the home PLMN thereof.

In FIG. 1 a PSTN subscriber in Australia makes an international call to a mobile station MS having a home PLMN in Germany and being currently located in the home PLMN. The PSTN subscriber dials a prefix 0011 and the mobile station ISDN number MSISDN including a country code CC, a national destination code NDC and a subscriber number SN. The prefix 0011 is an international call code in Australia, and consequently, the local PSTN exchanges route the call to the international PSTN gateway in Australia. The international PSTN gateway routes the call to a destination country, i.e. Germany, according to the country code CC. The international PSTN gateway in Germany will route the call to the gateway MSC in the home PLMN of the called MS according to the national destination code NDC. The gateway MSC interrogates the home location register HLR of the called MS according to the NDC SN and then route the call to the called MS according to the mobile station roaming number MSRN obtained via the HLR. In the above case the PSTN subscriber will pay charge for the whole call.

Figure 2:
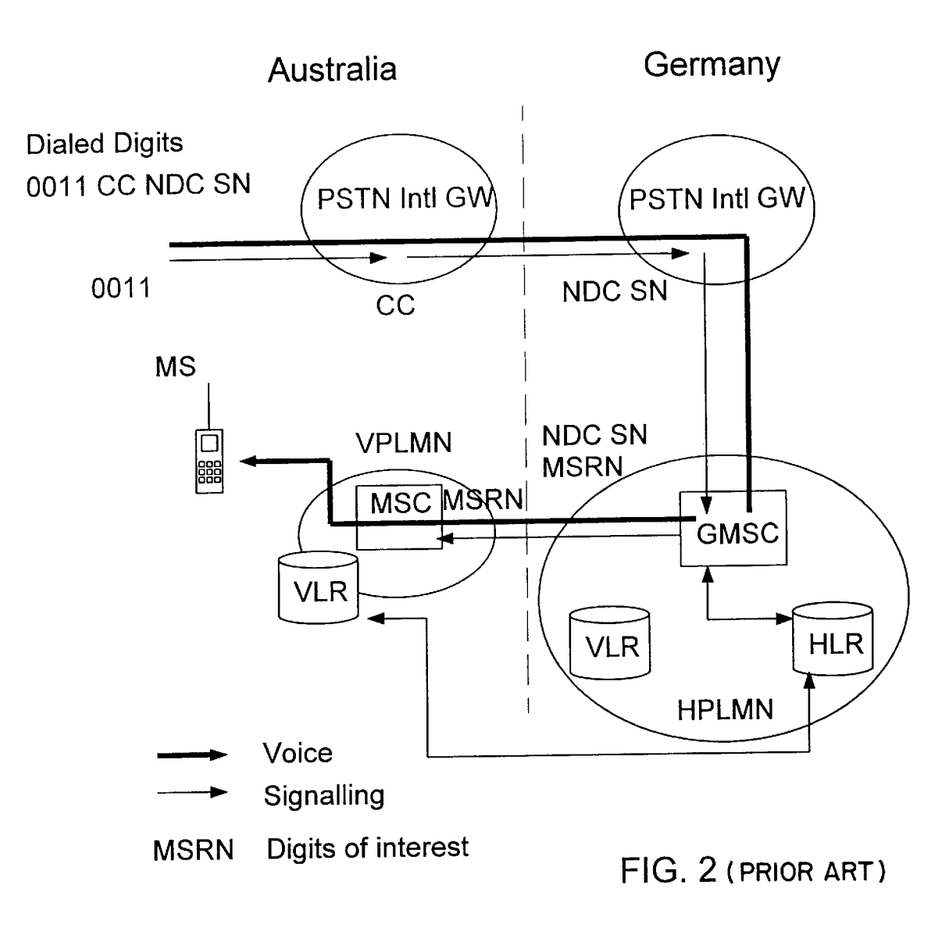
FIG. 2 is a system diagram illustrating the prior art call routing for a PSTN originating international call to a foreign mobile station roaming on a visited PLMN.

In FIG. 2 it is assumed that the called MS is roaming in a visited PLMN in Australia. Similar to the above case in the first half of the routing, the call is first of all routed to the home country and the home PLMN of the called MS. The mobile station roaming number MSRN is then obtained via the HLR and the call will then be routed to the MS in Australia via another international leg. As a consequence, two international legs and the associated call charges are involved in the call. The charge for the first international leg will be paid by the calling party and the charge for the second international leg will be paid by the called MS.

There are several reasons for such a strange, costly routing configuration in the international calls. The current routing topology of telecommunication network has hundreds of local exchanges, each exchange having a routing table to find the right route for the call. The maintenance of these routing tables is very time consuming and complicated, and therefore, the tables are always made as simple as possible. Thus, only a few digits of the dialed telephone number are analysed at each section of the call route. For example, when a PSTN subscriber dials a telephone number 0011 CC NDC SN, the local PSTN exchange will only recognise the international prefix 0011 and then go straight to the international gateway, as in the cases shown in FIGS. 1 and 2. A local PSTN exchange ignores the content of the following digits in the telephone number. The GSM specifications has suggested that any equipment along the call handling path can be an intelligent gateway that performs the HLR interrogation and thereby optimises the routing of the call. However, the implementation of this function would require implementation of GSM signalling capability into the existing international gateway PSTN exchanges which will require some very costly software development or maybe even impossible because of the old switching platforms. The current specifications of CCITT could actually overcome the problem by using the rerouting capability of the international gateway relating to the CCITT Common Channel Signalling System 7 (C7). However, international carrier and PTT are reluctant to implement the automatic re-routing function into their international gateways because:

- The international circuits do not always support the use of common channel signalling system 7. The re-routing function will not be easily implemented in such a non-C7 systems.
- The normal international telephony does not require that kind of function. Only the automatic international roaming of GSM or DCS1800 or the international call forwarding cases require the re-routing function. This is a relatively small percentage of the total traffic.
- The high development costs of the re-routing function would only lead to a lower revenue to them. Since optimised routing would result in no double international legs and thereby in less international toll charges.

Therefore there is a need for improved international routing in order to avoid unnecessary international legs of PSTN originating and mobile terminating calls in international automatic roaming.

DISCLOSURE OF THE INVENTION

It is an object of the present invention to improve the routing of the international mobile terminating calls.

It is a further object of the present invention to avoid double leg international call to a mobile subscriber in a mobile telecommunications system supporting international automatic roaming.

These and other objects and advantages of the present invention are achieved by a method of routing an international call from a first subscriber of a first telecommunication network in a first country to a mobile subscriber having a home public land mobile network (PLMN) in a second country, wherein a first subscriber of a first telecommunications network in a first country dials a predetermined prefix reserved only for international mobile subscriber terminating calls in the first country, and a mobile station ISDN number of a called mobile subscriber having a home PLMN in a second country, the first telecommunications network in the first country routes the call according to said prefix to a predetermined network element in the first country having an international PLMN interrogation capability, the predetermined network element makes an interrogation to the home PLMN of the called mobile subscriber in the second country, the home PLMN of the called mobile subscriber sends to the predetermined network element a mobile subscriber roaming number allocated for the called mobile subscriber, the predetermined network element routes the call directly to a destination according to the mobile subscriber roaming number.

According to the present invention a new prefix is provided in a telecommunications network, such as PSTN, for routing the PSTN originating international call to a foreign mobile subscriber. The new prefix will be herein called as an international mobile call prefix which substitutes a normal prefix for outgoing international calls before a standard telephone subscriber number. When a local PSTN exchange receives the international mobile call prefix in the dialed telephone number, it will route the call to a predetermined destination in the same country. The predetermined destination is a network element having a capability of making international routing information interrogation to a home PLMN of a called foreign mobile subscriber. Upon receiving the routing information from the home PLMN the call will be routed to the current location of the called foreign mobile subscriber according to the routing information. In case the called foreign mobile subscriber is roaming outside the home PLMN, the call can be routed directly to the visited PLMN without an unnecessary international leg to the home PLMN. In case the visited PLMN is in the same country as the calling PSTN subscriber, the call will a relatively cheap local call and there will be no international legs involved in the call. This will result in a significant reduction in call charges in comparison with the prior art routing configuration in which a double international leg was established when the mobile subscriber was roaming in the country of the calling party. Also when the called foreign mobile subscriber is roaming in a third country the routing of the call is optimised and more economical than in the prior art routing configuration. In fact, the routing of the PSTN originating calls will be as well optimised as the mobile station originating calls. The interrogating network element to which the PSTN routes the call according to the international mobile call prefix may be an existing mobile exchange of a PLMN in the country, or it may be a special purpose service center which offers interrogation and routing services for PSTN originating international calls to foreign mobile subscribers. The operator of the interrogation and routing service may be one of the PSTN or PLMN operators in the country, or, alternatively, independent of them. The present invention results in a reduction of the call charges in call to a mobile subscriber roaming outside home PLMN and thereby makes the automatic international roaming more attractive for both the mobile subscribers and the PSTN subscribers. The present invention is especially advantageous for mobile subscribers who are frequently travelling between two countries and are expecting significant amount of incoming local calls in both countries. The call will be a local call in many circumstances or a call with only one international leg in any call circumstances. The subscriber may also barr routing of the call with preset conditions, for example, in case the called mobile subscriber is not roaming in the country of the calling PSTN party or is roaming outside both of these countries.

The present invention can be implemented in a simple manner. In a PSTN network the new international mobile call prefix must be introduced into the routing tables of the exchanges. The interrogating network element to which the calls with the new prefix will be routed may be an existing gateway mobile exchange which already has the necessary interrogating and routing capability for international calls.

BRIEF DESCRIPTION OF THE DRAWINGS

These and other objects and advantages of the invention will be apparent upon reading the following description in conjunction with the drawings, in which.

PREFERRED EMBODIMENTS OF THE INVENTION

The present invention can be applied to international calls from other circuit switched telecommunication networks to any mobile communication system supporting automatic international roaming.

The call may originate from any telecommunications network which offers circuit switched telecommunication service, such as voice, facsimile or bearer service. Common feature to these networks is that they route the call from the origin to the destination according to the dialled digits, normally in the ISDN numbering format. Such other networks may include, for example, PSTN (Public Switched Telephone Network), ISDN (Integrated Services Digital Network), other type of Public Land Mobile Telecommunications Network, such as NMT, etc. In the following, the referred embodiments of the present invention will be described in connection with PSTN. The invention is not, however, not restricted to this particular network.

The destination network of the call may be, for example, European digital mobile telephone system GSM (Global System for Mobile Communication) and its modification DCS1800 (Digital Communication System). The GSM supports both mobile station roaming in which mobile station moves from one PLMN to another, and a subscriber identification module (SIM) roaming in which only a SIM moves. The latter may allow also roaming between PLMNs having incompatible radio interfaces, such as different operating frequencies. In the following, the preferred embodiments of the invention will be described in connection with the GSM system. The invention is, however, not restricted to this specific system.

The specific structure of the mobile communication system and the routing procedure for mobile terminating calls inside the mobile communication system is not essential to the present invention. Therefore, they will not be described herein. For a description of the GSM system a reference is made to the GSM specifications and to the book "The GSM system for mobile communications" M. Mouly ja M. Pautet, Palaiseau, France, 1992, ISBN:2-9507190-07-7.

Figure 7:
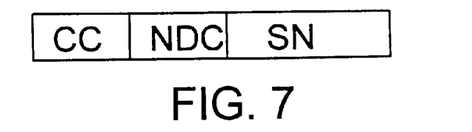
FIG. 7 shows a structure of a mobile station directory number.

The conventional routing of the international call from PSTN subscriber to foreign mobile subscribers were described above with reference to FIGS. 1 and 2. The telephone number dialed by a PSTN subscriber consists of the international call code 0011 in Australia and the mobile station directory number MSISDN including a country code CC, a national destination code NDC and a subscriber number SN. The structure of the MSISDN is shown in FIG. 7. MSISDN looks like a standard PSTN or ISDN number, but the NDC identifies the mobile system operator within a country and not an area code. Because the MSISDN does not refer to a telephone line or a location, the first digits in the subscriber number SN following the NDC are used to identify the relevant subscriber's HLR within the home PLMN. The HLR record contains information necessary for finding the final destination of the call, i.e., the MSC where the GSM user is currently visiting. As a consequence, the final routing can be done only after the interrocation of the HLR. The first part of the routing is done only with the information that can be derivated from the called number, MSISDN, independently from the called party location. This routing is done as for any ISDN number, with tables in each of the intervening exchanges. For example, when the international prefix such as 0011 in Australia, is dialed before the MSISDN, the call will be routed to the PSTN international gateway by the PSTN exchanges, as described with reference to FIGS. 1 and 2.

Figure 8:
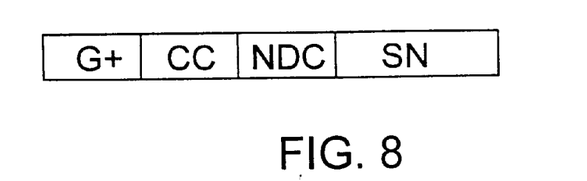
FIG. 8 shows a MSISDN provided with the international mobile call prefix.
Figure 9:
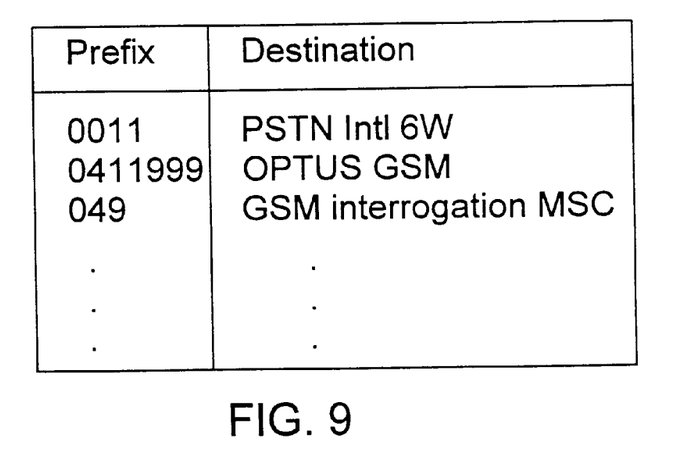
FIG. 9 shows a routing table provided with a international mobile call prefix according to the present invention.
Figure 10A:
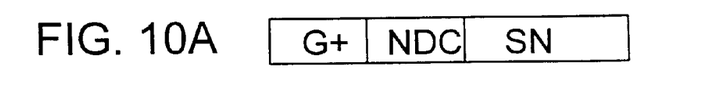
FIGS. 10A and 10B show MSISDN including the international mobile call prefix.
Figure 10B:
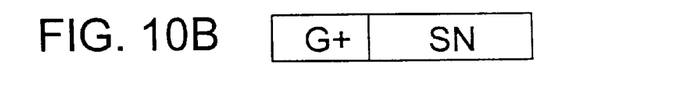

According to the invention a new prefix is provided in a PSTN for routing the PSTN originating international calls to foreign mobile subscribers. The new prefix, herein called as an international mobile call prefix G+, substitutes a normal international prefix for outgoing international calls before the MSISDN, as shown in FIG. 8. Alternatively, the prefix can imply part of the MSISDN as illustrated in FIGS. 10A and 10B as well as the example to be described below in FIG. 4. The routing tables in the PSTN exchanges are provided with the new prefix (or prefixes). FIG. 9 shows an example of a routing table which includes prefix 0011 for PSTN international gateway (Intl GW), prefix 041 for OPTUS GSM (Australian GSM network), and prefix 049 for GSM Interrogation MSC according to the invention. Either of the prefices 041 and 049 may be utilized as the international mobile call prefix depending on the application, as will be described below.

When a PSTN exchange receives the international mobile call prefix G+, it will route the call to a predetermined destination in the same country. The predetermined destination is a network element having a capability of making international routing information interrogation to a home PLMN of a called foreign mobile subscriber MS. This interrogating network element can be a gateway mobile exchange GMSC in an existing PLMN as will be described with reference to FIG. 3. In that case the prefix G+ can be the prefix of the PLMN provided with additional digits, such as 0411999 for Optus GSM. Alternatively, the interrogating network element can be a special purpose service center as will be described with reference to FIGS. 4, 5 and 6. In this case, the international prefix according to the present invention can be a dedicated code, such as 049 for GSM interrogation MSC in FIG. 10. The prefix G+ can be different in different countries, or alternatively, a single prefix G+ can be assigned to provide inventive routing in all countries using GSM and anticipating automatic roaming service. This is particularly advantageous when an international C7 network is utilized for the international routing according to the present invention.

The routing according to the present invention will now be explained by means of examples with reference to FIGS. 3, 4, 5 and 6.

Figure 3:
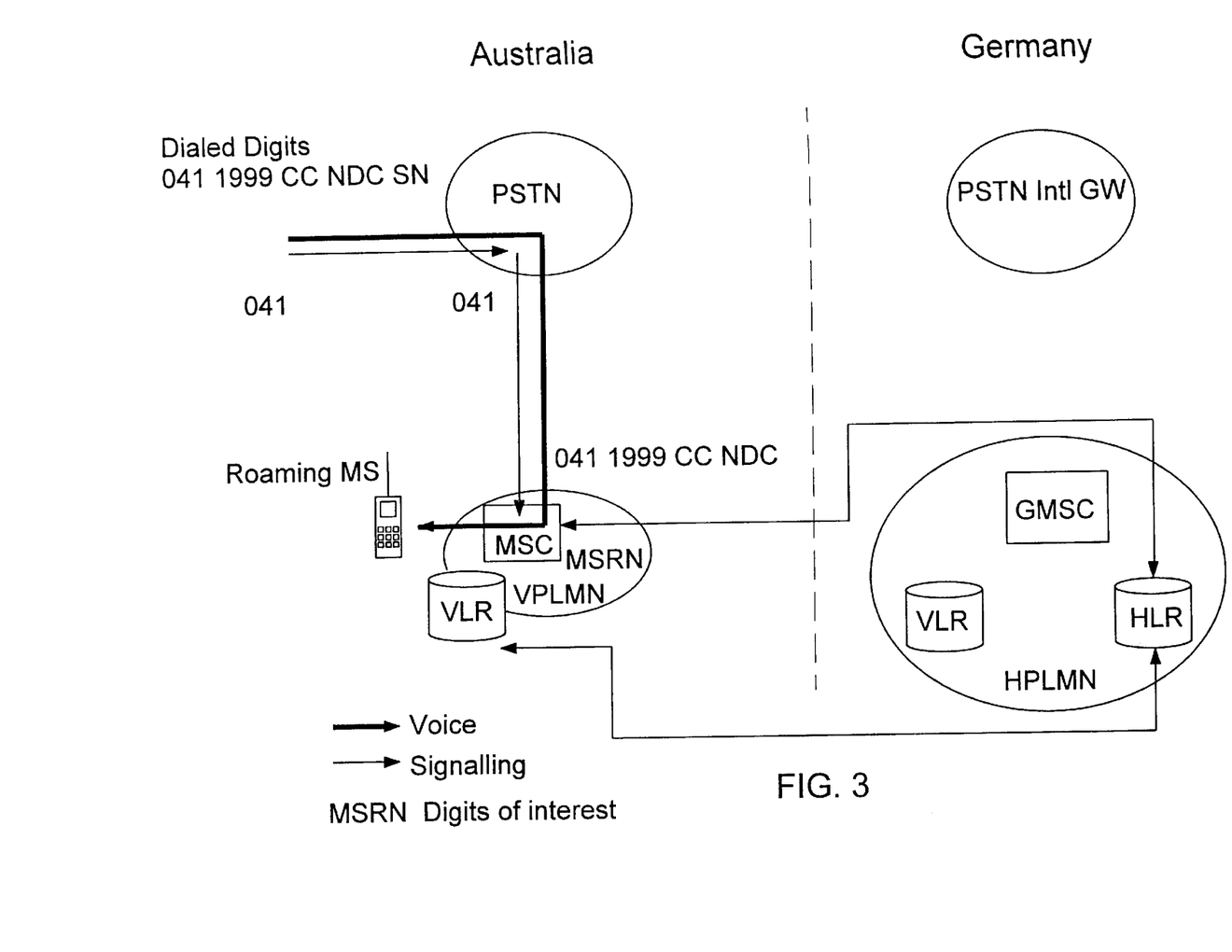
FIG. 3 is a system diagram illustrating call routing according to the invention for a PSTN originating international call to a foreign mobile subscriber roaming in a visited PLMN.

In FIG. 3 a PSTN subscriber in Australia makes an international call to the mobile station MS having a home PLMN in Germany and roaming in a visited PLNM in Australia. The PSTN subscriber dials a prefix 0411999 as an international call prefix before MSISDN. The local PSTN routes the call to the Optus GSM network in Australia according to the 0411999 digits. In the numbering plan of Optus GSM network a special service level is allocated for digits 0411999. In other words the gateway MSC in Optus GSM will note 0411999 as a special level for roaming MS. The gateway MSC will analyze CC NDC in the MSISDN and identify the German HLR. The gateway MSC will interrogate the HLR using the GSM signalling protocol MAP. The HLR in home PLMN of the roaming MS in Germany will send the mobile station roaming number MSRN. Since MS is roaming in Australia, this MSRN will be an address of an MSC/VLR in Optus GSM, and therefore the interrogating gateway MSC will route the call to the MSC in the local PLMN in Australia. As a result no international legs are required and only a local call is established.

Figure 4:
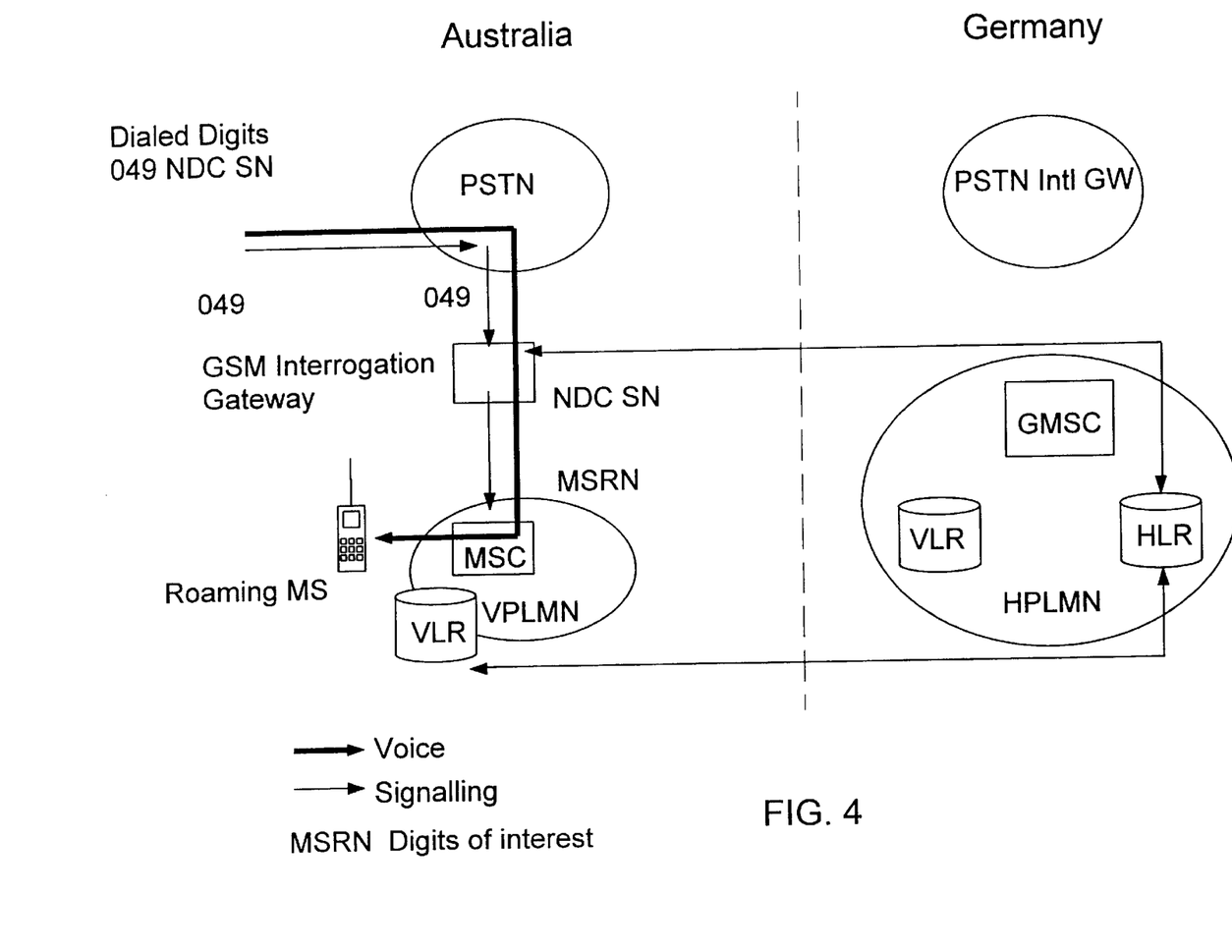
FIG. 4 is a system diagram illustrating a special purpose interrogating exchange and call routing for a PSTN originating international call to a foreign mobile subscriber roaming in visited PLMN.

According to another embodiment of the present invention a special purpose service center is provided for interrogation and routing the international mobile calls. In FIG. 4 a GSM interrogation MSC is provided having a GSM interrogation capability. Let's again assume that a PSTN subscriber in Australia makes an international call to a MS having a home PLMN in Germany and roaming in a visited PLMN in Australia. The PSTN subscriber dials the international mobile call prefix 049 before the MSISDN. The local PSTN in Australia routes the call, according to the routing table in FIG. 9, to the GSM interrogation MSC, also in Australia. The GSM interrogation MSC makes an interrogation to the HLR in the home PLMN of the called MS in Germany. In FIG. 4, the CC is not the dialed digits for it is implied in the 049 prefix. The HLR sends to the GSM interrogation MSC a MSRN referring to a MSC/VLR in the local PLMN (the visited PLMN). As a consequence, the GSM interrogation MSC routes the call to the local PLMN in Australia.

Figure 5:
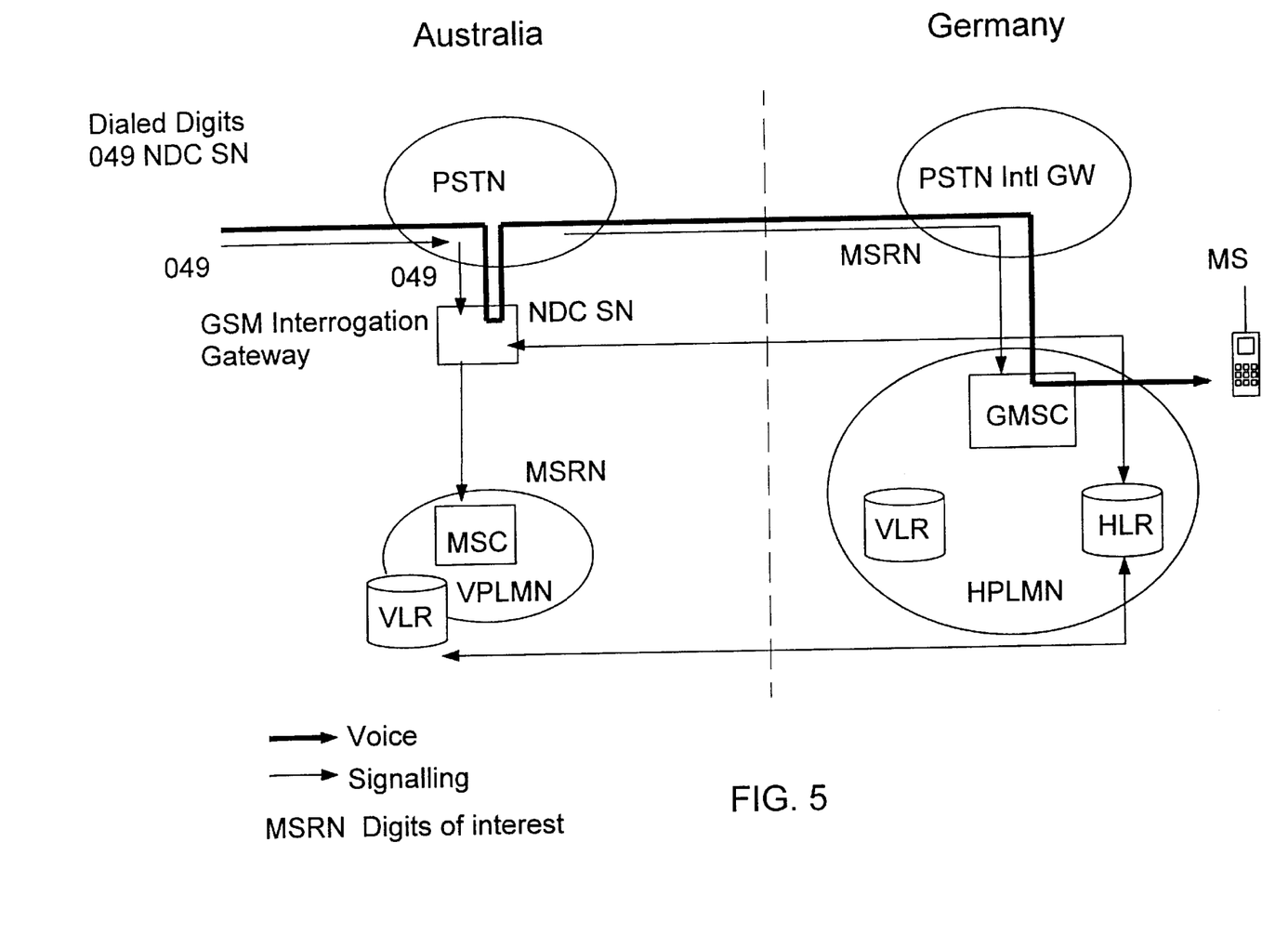
FIG. 5 is a system diagram illustrating a special purpose interrogating exchange and call routing for a PSTN originating international call to a foreign mobile subscriber located in the home PLMN thereof.

FIG. 5 illustrates call routing when a PSTN subscriber in Australia makes an international call to a MS having a home PLMN in Germany and being currently located in the home PLMN. Again, the PSTN subscriber dials a prefix 049 before the MSISDN. Similar to FIG. 4, call will be routed to the GSM interrogation MSC in Australia and an interrogation will be made to a HLR in the home PLMN in Germany. Since the called MS is located in home PLMN, the HLR will send a MSRN referring to a MSC in the home PLMN in Germany. Upon receiving the MSRN the GSM interrogation MSC in Australia will route the call to the PSTN international gateway in Australia, further to the PSTN international gateway in Germany and finally to the gateway MSC in the home PLMN in Germany. In this case one international leg is needed similar to the case illustrated in FIG. 1.

Figure 6:
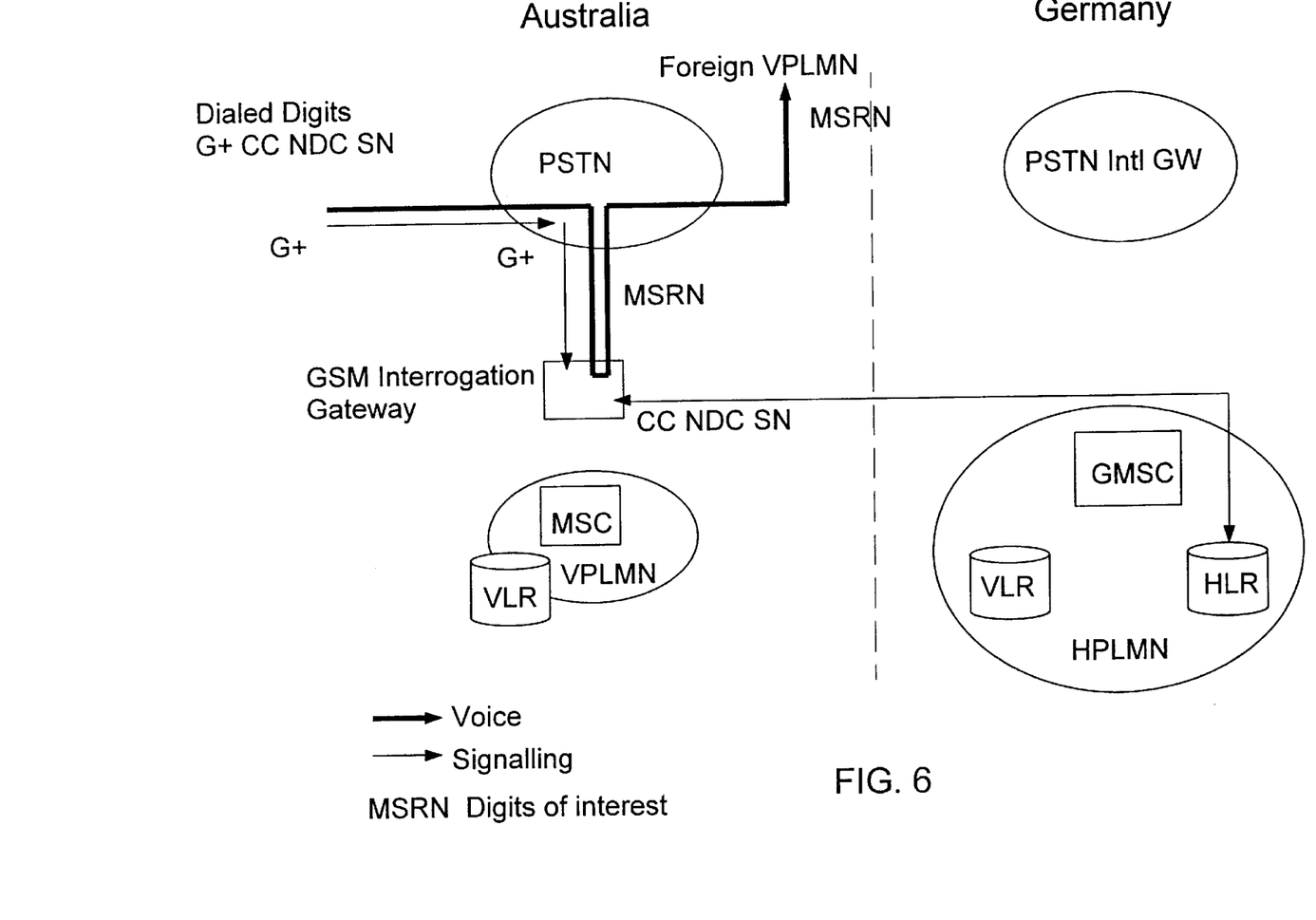
FIG. 6 is a system diagram illustrating a special purpose interrogation exchange and call routing for PSTN originating international call to a foreign mobile subscriber roaming in a third country.

In FIG. 6, a PSTN subscriber in Australia makes an international call to a MS having a home PLMN in Germany and roaming in a foreign visited PLMN in a third country. Again, the PSTN subscriber dials the international mobile code prefix G+, and the call will be routed to the GSM interrogation gateway. The GSM interrogation gateway makes an interrogation to the home PLMN in Germany and receives a MSRN which refers to a MSC in the foreign visited PLMN in the third country. As a result, the GSM interrogation gateway routes the call to the PSTN international gateway in Australia, to the PSTN international gateway in the third country, and further to the foreign PLMN. Again, international legs will be avoided between Australia and Germany.

The GSM interrogation MSC may have a barring function for calls in which MSRN is a foreign number. For example, the GSM interrogation MSC may route the call only if the MS is in either Australia or Germany.

The operator of the GSM interrogation MSC may be one of the PSTN and PLMN operators, or totally independent of them. There may be a separate call charge for using the international mobile call prefix, the charge being, however, much lower than the charge for an international call. The use of the international mobile call prefix may be allowed only for PSTN and PLMN subscribers having a separate subscription to the service.

The attached figures and the associated description are intended merely to illustrate the present invention. The details of the invention may vary within the scope and spirit of the attached claims.

I claim:

1. A method of routing an international call from a first subscriber of a first telecommunication network in a first country to a mobile subscriber having a home public land mobile network (PLMN) in a second country, wherein a first subscriber of a first telecommunications network in a first country dials a predetermined prefix reserved only for international mobile subscriber terminating calls in the first country, and a mobile station ISDN number of a called mobile subscriber having a home PLMN in a second country, the first telecommunications network in the first country routes the call according to said prefix to a predetermined network element in the first country having an international PLMN interrogation capability, the predetermined network element makes an interrogation to the home PLMN of the called mobile subscriber in the second country, the home PLMN of the called mobile subscriber sends to the predetermined network element a mobile subscriber roaming number allocated for the called mobile subscriber, the predetermined network element routes the call directly to a destination according to the mobile subscriber roaming number.

2. A method according to claim 1, wherein the first telecommunications network in the first country routes the call according to said prefix to a mobile exchange in a PLMN of the first country having an international PLMN interrogation capability.

3. A method according to claim 1, wherein the first telecommunications network in the first country routes the call according to said prefix to a special purpose exchange offering interrogation and routing service for international calls originating from the first telecommunications network in the first country to mobile subscribers having a home PLMN in a foreign country.

4. A method according to claim 1, wherein the first telecommunications network in the first country routes the call according to said prefix to a PLMN interrogation gateway.

5. A method according to claim 1, comprising steps of analyzing the mobile station roaming number by the predetermined network element, barring of the routing of the call to a destination outside the first and second countries by the predetermined network element.

6. A method according to claim 1, comprising steps of analyzing the mobile station roaming number by the predetermined network element, barring of the routing of the call to a destination outside the first country by the predetermined network element.

7. A method according to any one of the preceding claims, wherein the first telecommunications network is a public switched telephone network or a integrated services data network.

* * * * *